United States Patent
Schwartz et al.

(10) Patent No.: US 10,652,484 B1
(45) Date of Patent: May 12, 2020

(54) METHOD TO OBTAIN DATA CUBES OF LOW INTENSITY INTRINSIC SPECTRAL IMAGES WHEN IMAGING UNDER HIGH ILLUMINATION CONDITIONS WITHOUT THE USE OF FILTERS

(71) Applicant: Center for Quantitative Cytometry, San Juan, PR (US)

(72) Inventors: Abraham Schwartz, San Juan, PR (US); Philip Sherman, Cleveland, OH (US); Adolfas Gaigalas, Riviera Beach, FL (US); Peter Ingram, Raleigh, NC (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 16/657,937

(22) Filed: Oct. 18, 2019

(51) Int. Cl.
| | |
|---|---|
| *H04N 5/353* | (2011.01) |
| *H04N 5/232* | (2006.01) |
| *H04N 5/235* | (2006.01) |
| *G01J 3/02* | (2006.01) |
| *G06T 7/80* | (2017.01) |
| *H04N 5/33* | (2006.01) |

(52) U.S. Cl.
CPC .......... *H04N 5/3537* (2013.01); *G01J 3/0264* (2013.01); *G01J 3/0289* (2013.01); *G06T 7/80* (2017.01); *H04N 5/2353* (2013.01); *H04N 5/232121* (2018.08); *H04N 5/232127* (2018.08); *H04N 5/332* (2013.01); *G06T 2207/10036* (2013.01); *G06T 2207/10144* (2013.01); *G06T 2207/10148* (2013.01); *G06T 2207/20101* (2013.01)

(58) Field of Classification Search
None
See application file for complete search history.

(56) References Cited

U.S. PATENT DOCUMENTS

| | | |
|---|---|---|
| 6,433,325 B1 | 8/2002 | Trigg |
| 8,185,320 B2 | 5/2012 | Rimm et al. |

(Continued)

*Primary Examiner* — Cynthia Segura
(74) *Attorney, Agent, or Firm* — Hoglund & Pamias, PSC; Roberto J. Rios

(57) ABSTRACT

The invention provides a method of obtaining data cubes such that elimination of the irrelevant portion of the illumination reveals the low intensity intrinsic spectral components. The method obtains target and reference data cubes using a single camera and of a single field of view so that low-level intrinsic spectral components may be detected and enhanced under conditions of high illumination intensity without the use of filters. Two exposures in rapid succession of the same field of view at the same camera settings are taken, one exposure of the target is taken under coherent conditions where the field of view is in focus, and the second exposure is of the same field of view taken under non-coherent conditions where the target is defocused such that it has no discernible spatial features in the field of view. Residual spectra previously determined is added to the defocus spectra in the defocus data cube of the target of interest resulting in an adjusted reference spectra, which in turn is subtracted from the corresponding focused spectra in the focused data cube of the target of interest resulting in a focused target data cube each of whose pixels is associated with its intrinsic spectrum.

13 Claims, 9 Drawing Sheets a) Halogen Illumination b) Intrinsic Processed (56) References Cited

U.S. PATENT DOCUMENTS

| | | | | |
|---|---|---|---|---|
| 8,559,714 | B2 * | 10/2013 | Smith | G06K 9/4661 |
| | | | | 382/167 |
| 9,998,636 | B2 * | 6/2018 | Schwartz | G06T 5/50 |
| 2003/0076571 | A1 * | 4/2003 | MacAulay | G02B 21/0028 |
| | | | | 359/237 |
| 2013/0242360 | A1 * | 9/2013 | Aikawa | H04N 1/00005 |
| | | | | 358/504 |

* cited by examiner

Figure 8b a) Halogen Illumination b) Intrinsic Processed

Figure 9

METHOD TO OBTAIN DATA CUBES OF LOW INTENSITY INTRINSIC SPECTRAL IMAGES WHEN IMAGING UNDER HIGH ILLUMINATION CONDITIONS WITHOUT THE USE OF FILTERS

TECHNICAL FIELD

This invention relates to a novel method of obtaining imaging data cubes and applying intrinsic spectral processing to these imaging data cubes. More specifically, this invention is applicable, but not limited, to mono-spectral, multi-spectral and hyper-spectral imaging data cubes, cameras and spectrometers.

BACKGROUND OF THE INVENTION

Every tangible material is defined by its intrinsic properties, from the smallest simple atomic particle to the largest elementally complicated object. Spectroscopy reveals the intrinsic spectral properties by how a material responds to illuminating electromagnetic energy. The environment can alter intrinsic properties of a material therefore description of the environment needs to be a defining part of intrinsic properties. It is important to understand that intrinsic properties are not a function of the illumination. For example, the absorption envelope of a material is an intrinsic property of the material that will absorb only when the illumination wavelengths fall within that envelop. The intrinsic properties are independent and provide a consistency to the spectra, regardless of the illumination or instrumentation.

An intrinsic spectrum is defined as having only spectral components that are produced when a material absorbs electromagnetic energy. These intrinsic components include, but not limited to, absorption, emission, transmission and partial-reflection. Any illumination energy that is not absorbed is considered irrelevant and removed from the intrinsic spectrum.

U.S. Pat. Nos. 9,435,687, 9,998,636, and 10,337,916, incorporated herein by reference in their entirety, teach that irrelevant spectral components can be eliminated to reveal only the intrinsic spectral components of a material of interest. As explained in the above-referenced patents, in order to eliminate the irrelevant components, two types of spectra are required: 1) the target spectrum containing intrinsic and irrelevant components, and 2) the reference spectrum containing the illumination, foreground and background spectral components. By simply subtracting the reference spectrum from the target spectrum will not produce an intrinsic spectrum. The instrument must first be calibrated to obtain a spectrum that has zero intensity values across the wavelength range of the illumination. This is accomplished by first obtaining an empty target spectrum that is also devoid of any material components and an empty reference spectrum that is devoid of any material components. By subtracting the empty reference spectrum from the target spectrum, a Residual Spectrum is created representing the differences between the target and reference spectra across the illumination wavelength range. By adding the Residual Spectrum back into the reference spectrum and then subtracting this adjusted reference spectrum from the target spectrum, the resulting spectrum will have zero intensity across the illumination wavelength range. This spectrum is referred to as a Zero Order Spectrum and serves as validation that the instrument is calibrated. In subsequent acquisition of data at the same instrument settings, the Residual Spectrum from the calibration step is added to the reference spectrum of the new data and that adjusted spectrum is subtracted from the new target spectrum to form the Intrinsic Spectrum.

Imaging data cubes from mono-spectral, multi-spectral and hyper-spectral cameras contain two types of data; spatial and spectral, where each pixel in a spatial field of view is associated with the spectrum derived from the material imaged by that pixel. When the spectra are super imposed onto the spatial image, this results in a spectral image that indicates the location of the materials of interest within the spatial field of view.

Figure 1:
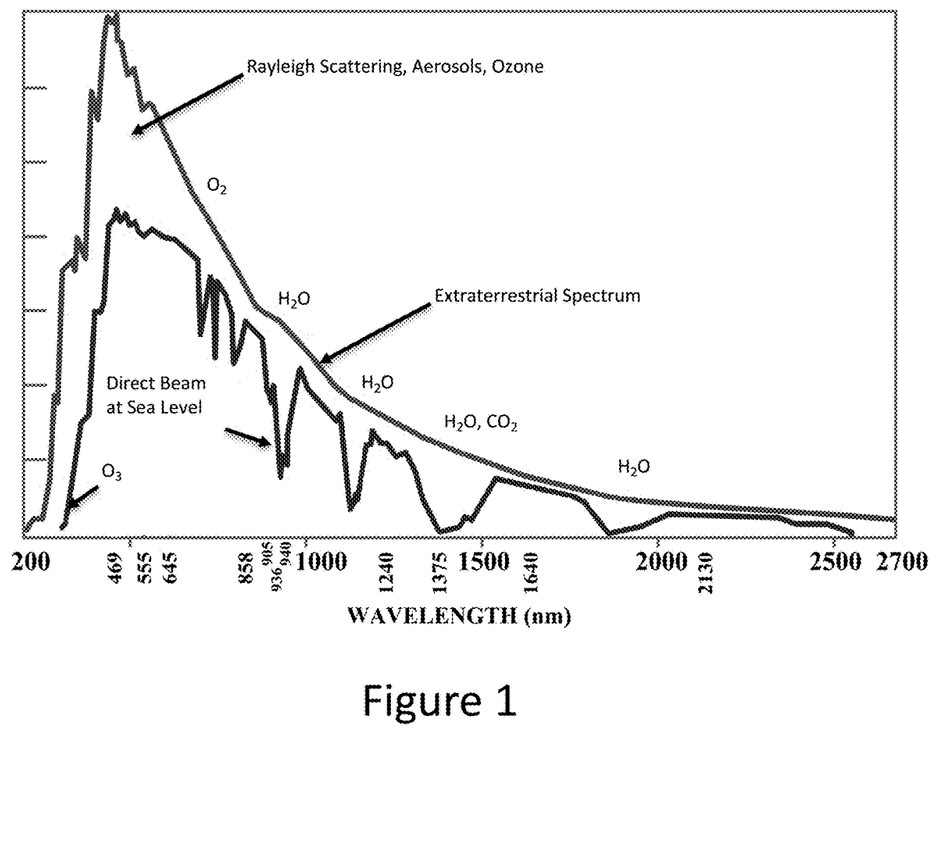
FIG. 1 shows the spectra of the solar illumination containing spectral components of gases, aerosols and light scatter that can interfere with spectral imaging.

When performing spectral imaging over long distances, for example, from high altitude drones or satellites, irrelevant spectral components may be present in the foreground (the atmosphere) of the field of view. These spectral components include, but are not limited to, particulate aerosol content, and organic gaseous pollution, water vapor and Rayleigh light scatter that can overwhelm and hide the intrinsic spectral components of the material in the field of view (FIG. 1). The spectral content and concentration of these irrelevant components are constantly varying in the atmosphere due to weather conditions and the position of the sun. Presently, mathematical models are employed to estimate these foreground components in an attempt to eliminate them from the final spectral image. However, even the best modeling cannot accurately estimate foreground components present at the exact time the data cube was obtained. Actual measurement of these irrelevant spectral components acquisition is required to accurately determine and eliminate them from the spectral image.

The strongest irrelevant component within the data cubes is the illumination spectrum upon which the intrinsic spectral and irrelevant spectral components appear. When the material of interest absorbs a portion of the illumination energy it generates intrinsic spectral components and the remainder of the illumination energy can be eliminated from the resulting intrinsic spectrum via the methodology described in this description and the above-mentioned patents. Thus, the only other constant component in the intrinsic spectrum is the random instrument noise from mechanical, electronic, and thermal sources, as discussed in U.S. Pat. No. 10,337,916, incorporated herein in its entirety by reference.

U.S. Pat. No. 9,998,636, incorporated herein in its entirety by reference, explains how the intrinsic spectra are obtained for each pixel associated with a spatial image of the field of view from two independent data cubes. Theoretically, the intrinsic spectra are obtained by taking separate reference and target data cubes at the same time but of different fields of view that have the same illumination and foreground characteristics.

The challenge of increasing the signal intensity from low intensity spectral components in an image has been addressed in spectroscopy and photography through data processing algorithms. With spectroscopy, especially within the infrared wavelength range, Fourier transform analysis has improved the detection of low intensity spectral components. In the field of astronomy, astro-imaging techniques involve obtaining multiple long exposure images and processing them by aligning fields of view of the exposures and stacking them in an additive manner.

Cameras have also gone through rapid technical development during the last 30 years, mostly due to the improvement of cooled CCD and CMOS cameras with 16-bit sensitivity and low dark field noise. The camera improvements coupled with advanced image processing of combining multiple long exposures have produced stunning astro-images, as well as, valuable scientific information with respect to the spatial and spectral properties of the celestial objects being imaged. One of the most important factors in obtaining such high-quality terrestrial-based astro-images is the degree of darkness of the sky. It is advantageous to obtain data using the most sensitive low noise cameras under the darkest skies.

Dark sky earth bound astro-imaging is seasonally limited since only specific constellations are in the night sky during specific times of the year. During daytime, imaging astronomical objects is usually limited to the sun, the moon, and a few planets of the solar system such as Venus and Mercury. For imaging other astronomical objects during daylight, powerful sophisticated radio telescopes are required.

Pixel saturation is the technical factor preventing astro-imaging during daylight. Most of the modern cameras are based on 16-bit data providing a well depth of only 65,536. For these cameras, intensities greater than 65,536 are no longer within the linear range where image processing can be mathematically accomplished. Sunlight can completely overwhelm and saturate the pixels in these 16 bit cameras. The use of neutral density filters, high F-stops and very short exposure times can bring sunlight into the linear range, but it will proportionately reduce the low intensity of the astronomical objects against the illumination of the solar spectrum leaving them undetectable.

SUMMARY OF THE INVENTION

The present invention provides a new method of obtaining data cubes such that elimination of the irrelevant portion of the illumination reveals the low intensity intrinsic spectral components.

This invention provides a novel method of obtaining target and reference data cubes using a single camera and of a single field of view so that low-level intrinsic spectral components may be detected and enhanced under conditions of high illumination intensity without the use of filters.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

As explained in the above-mentioned patents, U.S. Pat. Nos. 9,435,687, 9,998,636, and 10,337,916, two different cameras, or a single camera with optics that can project both a target and reference field of view onto different areas of a single pixel array can be used. The reference data can be obtained from one field of view and the target data from a different field of view. However, two different fields of view can introduce different foreground and background data into the process. This can affect the accuracy and quality of the final spectral image. Another technical drawback of the above approach is that the spatial and spectral information from data cubes from two different cameras may be difficult to align due to differences in the pixel arrays thus introducing errors into the resulting images and spectra.

The present invention removes these sources of error by using a single camera and a single field of view from which the target and reference data cubes are obtained. According to the instant invention, this is accomplished by taking two exposures in rapid succession of the same field of view at the same camera settings. One exposure of the target is taken under coherent conditions where the field of view is in focus, and the second exposure is of the same field of view taken under non-coherent conditions where the target is defocused such that it has no discernible spatial features in the field of view.

This invention is highly advantageous when applied to distance spectral imaging where the illumination is strong and the atmosphere is constantly variable. As shown in FIG. 1, the illumination is by far the major spectral component in the spectrum. By eliminating the irrelevant illumination components, as well as, the atmospheric foreground components, the intrinsic spectral components can be revealed.

When two exposures are taken at different times, there is a possibility that the content of the foreground and illumination vary between the set of data cubes. However, it has been determined that by using the shortest time between exposures provided and allowed by the camera will substantially reduce the chance of introducing this error. While the exposure setting, focus/defocus settings and the time between consecutive focus/defocused shots might be manually controlled by a user, it is also envisioned that this procedure can be automated so that a software automatically performs at least one of: 1) determines the required exposure setting based on spatial conditions and the camera specifications and 2) changes the focus settings between shots in the shortest time possible by the camera specifications without departing from the spirit of the invention. In addition, the focused and defocused shots can be taken manually by the user or alternatively automatically.

Figure 2A:
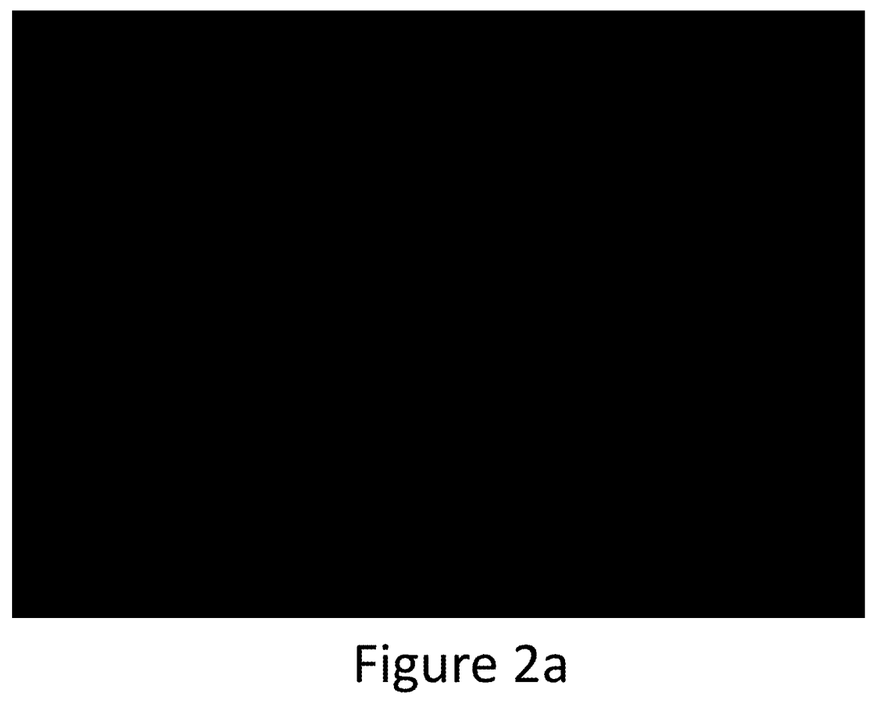
FIG. 2a shows a Zero Order Image indicating no intensities appearing in the field of view.
Figure 2B:
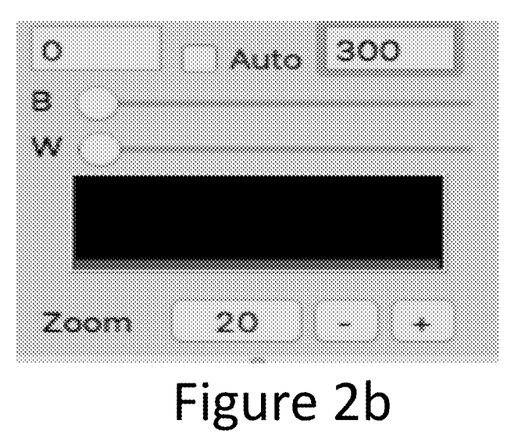
FIG. 2b shows a histogram of the Zero Order Image at a histogram range of 0-300 indicating no spectral components.

In addition, the intensities observed between the focused and defocused exposures on the same pixel will be different. However, this difference is accommodated when the instrument is calibrated and the Residual spectra are determined for each pixel and added to the defocused reference data cube. This not only yields a Zero Order Spectrum for each pixel in the field of view, but also results in generating a Zero Order Image across the field of view where all pixels have zero values across their associated spectra, as shown in FIGS. 2a-2b. This validates that there are no spectral components in the Zero Order Image under these camera settings after processing the calibration data cubes.

The novel methodology of the invention, which can be referred to as intrinsic processing, will be now explained in detail.

Field of View

The camera must be pointed at the target of interest and the optics of the camera are focused on the spatial field of view.

Setting the Camera for Data Cube Capture

The exposure must be set to the longest exposure allowed by the camera where the intensity of all the pixels are within the linear intensity range and none of them exceed saturation.

At the same exposure conditions, the defocus position of the camera where there is no discernible detail within the spatial image is also determined. Note these exposure and focus/defocus settings.

Acquisition of the Calibration Data Cube

The camera is pointed to an "empty" field of view that has minimal spatial features of low intensity where a set of focused/defocused data cubes of this empty field of view is obtained at the camera exposure and focus/defocus settings previously determined. This procedure is done by rapidly changing in the camera the focus settings between the two exposures. While according to an embodiment of the invention this procedure is done manually, it is also envisioned that it can be performed automatically by storing and/or programming these settings into a camera program so that the camera changes automatically the settings when the set of focused/defocused data cubes are obtained.

Acquisition of the Target Data Cubes

Point the camera to the field of view of the target of interest.

Obtain focused and defocused data cubes of the target field of view under the camera settings determined in step 2.

Residual Spectra

For each pixel in the spatial array, its associated spectrum in the defocused empty reference data cube is obtained and subtracted across the wavelength range from the corresponding focused empty target data cube pixels, respectively, to obtain the Residual spectra for each spatial pixel.

Zero Order Image (Validation)

This step of the invention is carried out to make sure that only intrinsic spectral components will be present after intrinsic processing of subsequent target fields of view.

Accordingly, the Residual spectra is added to the corresponding defocused reference spectra for each respective pixel of the original reference data cube. Afterwards, these adjusted reference spectra are subtracted from the corresponding spectra of the focused target data cube. This procedure generates a Zero Order Spectrum for each pixel in the field of view, and also results in a Zero Order Image where all spectral values for all the pixels in the field of view are zero. This validates that there are no irrelevant spectral components from the illumination, foreground or background (as shown in FIG. 2) of the empty field of view at the previously determined camera settings.

Obtaining Intrinsic Spectra

In order to obtain the desired intrinsic spectra, the Residual spectra previously determined is added pixel by pixel to the defocus spectra in the defocus data cube obtained in the Acquisition of the Target Data Cubes step resulting in an adjusted reference spectra.

Then, these adjusted reference spectra are subtracted pixel by pixel from the corresponding focused spectra in the focused data cube obtained in the Acquisition of the Target Data Cubes step. This results in a focused target data cube each of whose pixels is associated with its intrinsic spectrum.

Intrinsic spectra for subsequent focused target data cubes can be generated using the same set of Residual spectra previously determined, by adding these Residual spectra to the corresponding spectra of the new defocused target data cubes and then subtracting the new adjusted reference spectra from the new focused target spectra. It is important to ensure that the previously determined camera settings (exposure and focus/defocus) are not changed during the data acquisition process.

Intrinsic Spectral Intensification

In order to increase the signal intensity of the intrinsic spectral components associated with the array of respective spatial pixels, multiple sets of focused/defocused data cubes of the same target under the same camera settings can be collected. It is important to use the shortest delay possible between obtaining the focused/defocused data cubes in each set so as to minimize foreground and illumination differences between the data cubes in each set.

Thus, every set of new focus/defocus target data cubes must be processed as previously described in the Obtaining Intrinsic Spectra section using the previously determined Residual spectra.

Once the desired amount of sets has been collected, the spectra for each corresponding pixel of the focused target data cubes is added together to increase the signal intensity of the intrinsic spectral components associated with the array of respective spatial pixels.

Generating an Intrinsic Spectral Image

The spatial pixels of the image are validated and aligned when processing multiple data cube sets to form a single image. This can be accomplished using algorithms commonly used in photography to align multiple images.

The spatial image is overlaid with the intrinsic spectral components of interest and the image is then visually shown to a user on a printed medium such as but not limited to paper and/or displayed on a TV, monitor or equivalents thereof.

Practical Applications

This novel intrinsic processing can be applied to a number of disciplines, including, but not limited to, agriculture, geology, oceanography, medicine, security surveillance, quality control, forensic science, environmental science and astronomy. The methodology can be applied as a stand-alone computer-implemented program or as a plugin or add-on to third party photo processing software.

Application of this invention can be particularly beneficial for the field of astronomy as an enhancement to optical and spectral imaging. One of the main photographic requirements for astro-imaging is having minimal background illumination. A pristine dark sky, as considered by the International Dark Sky Association, has a magnitude greater than 21.5 per arc-second$^2$ meaning the sky is greater than 359 million times dimmer than the star Vega that has a magnitude of 0.03 per arc-second$^2$. The present invention can provide an image background that meets and exceeds this criterion as demonstrated in the Examples below.

The inventions described herein and in the above-mentioned patents, U.S. Pat. Nos. 9,435,687, 9,998,636, and 10,337,916, consider any illumination that is not absorbed by a material of interest as irrelevant when obtaining intrinsic spectral components and thus is completely removed by the methodology of these inventions. It is very unlikely that any of the local, i.e., solar or man-made illumination (light pollution) is absorbed by the deep sky targets located beyond the solar system. In this case it then follows that essentially all of the local illumination is considered irrelevant and is removed from the focused data cube by the novel methodology of this invention, as described above. On the other hand, since deep sky targets can themselves be illumination sources or illuminated by their local stars, they will appear as they normally do when imaged under pristine dark skies. Thus, one important aspect of the present invention, is that it allows conducting astro-imaging under light polluted skies.

EXAMPLES

This invention is not only applicable to mono-spectral, multi-spectral and hyper-spectral imaging data cubes, cameras and spectrometers, but it also allows the unrestrained use of various data formats, e.g., FITS, RAW, TIFF, and JPEG. In the case of monochrome and multi-spectral cameras, the data from each spectral (color) range may be obtained and processed separately before combining to form the full color spectral image. With hyper-spectral data cubes a unique complex spectrum is associated with each respective spatial pixel. To simplify the understanding of this invention, the following practical examples are presented using data in a format where the spectral components are considered as the intensities of each pixel.

The following examples illustrate that the present invention can process at least three different illumination configurations: 1) where the target is outside the solar system and the local solar and pollution illumination is completely eliminated since none of these components are absorbed by the target, M13, a globular star cluster at a distance of 22,000 light years and is its own source of illumination, 2) where the local solar illumination is partially absorbed by the target, the Moon, at a distance of 384,400 kilometers and is view by partial reflection of the illumination, and 3) where the target, M8, the Lagoon Nebula at a distance of 4,100 light years is absorbing illumination from its local stars and emitting fluorescence.

The imaging for these three examples was conducted in the city of San Juan, Puerto Rico were the light pollution was measured at a magnitude of 17.4-18.2 per arc-second$^2$.

Example 1

Equipment

The data cubes were obtained using an AstroPhysics 104 mm refractor affixed with a modified Canon T2i DSLR camera with the infrared filter removed. The telescope was mounted on a Sirius GoTo tracking mount. Focusing was done manually using the end stop of the focus train as the defocused setting and a mechanical focusing guide to return the telescope to the focused position. The data cubes were taken during the week of a full moon.

Camera Calibration Data

The images were obtained in the RAW monochrome format to ensure that there was no compression of the data. A set of six dark field exposures was obtained with the lens cap on the telescope and their average was used to remove hot pixels on the sensor array of the camera. The empty field of view was chosen to be located at a region of the sky that contained no stars or objects having a magnitude less than 8 per arc-sect. In other words, no element of said empty field of view has a magnitude less than 8 per arc-sect.

The telescope was focused using the dim stars in the empty field of view. An exposure time of 15 seconds at ISO1600 was determined to keep all objects under saturation and within the linear range of the camera response. A 15 second focused image of the empty field of view was taken and the telescope was quickly defocused and another 15-second image of the same empty field of view was obtained.

Target Imaging Data

Figure 3A:
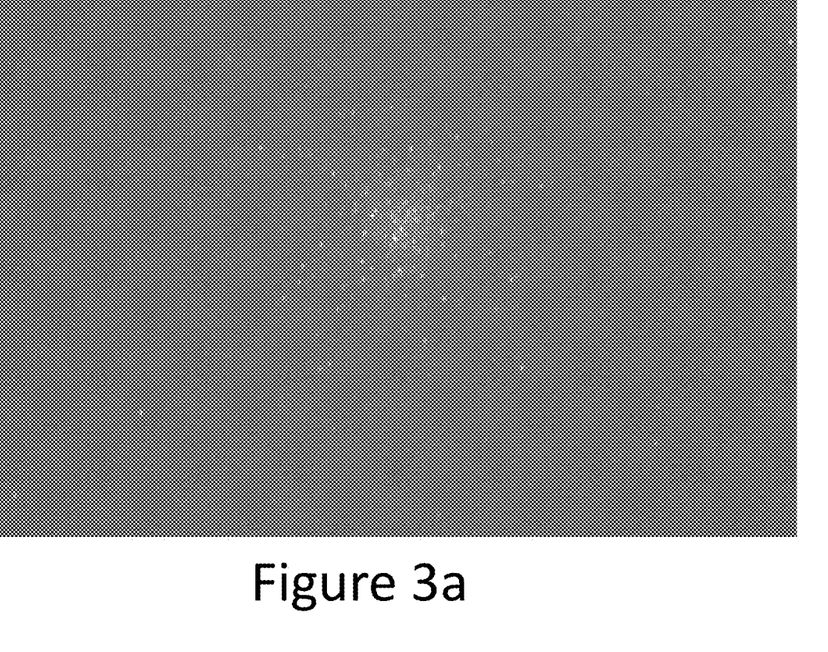
FIG. 3a shows an image of M13 taken at a 15-second exposure, ISO 16000 in a sky containing moonlight and urbane light pollution with a magnitude of 18.2 per arc-sec$^2$
Figure 3B:
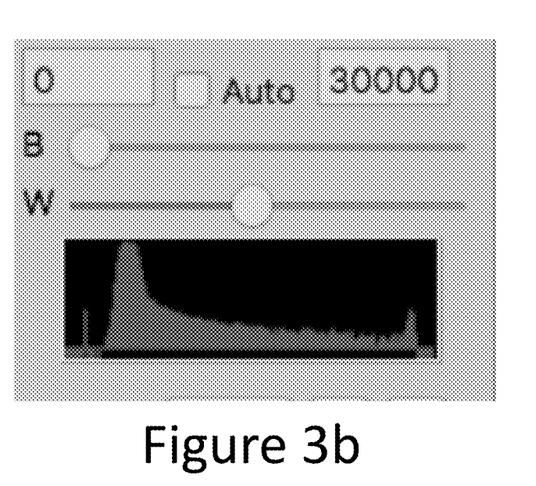
FIG. 3b shows a histogram of the image of M13 before intrinsic processing, according to the present invention.

The telescope was then directed to and focused on globular star cluster M13 as the target object. An image was taken with a 15 second exposure, FIG. 3a. The telescope was quickly defocused and a second image was taken of the same target field of view with an exposure of 15 seconds.

Intrinsic Processing

The average of the six dark field images was subtracted from the focused and defocused images to remove the hot pixels.

The Residual intensities for each pixel were obtained by subtracting the intensities of the defocused empty reference image from the focused empty target image, respectively.

The Residual intensities were than added to the empty defocused reference intensities and these adjusted empty defocused reference intensities were subtracted from the empty focused target pixel intensities, respectively, to yield the Zero Order Image where all intensities of the image were validated to have a value of zero, as shown in FIG. 2a.

Figure 4A:
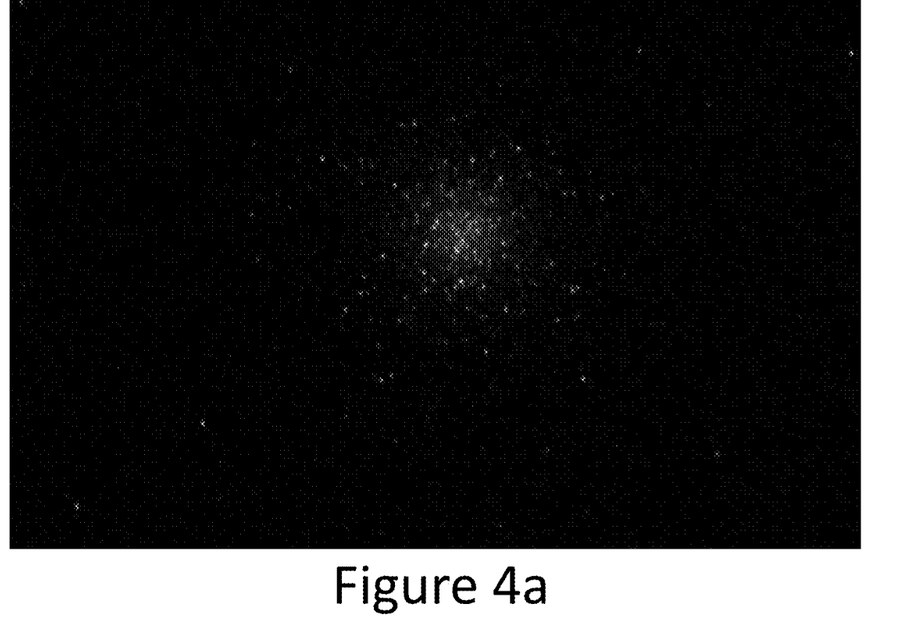
FIG. 4a shows an image of M13 in FIG. 3a after being processed according to the methodology of the present invention where the magnitude of the sky has a darkness of greater than magnitude 22 per arc-sec$^2$ without changing the intensity of the target, M13.
Figure 4B:
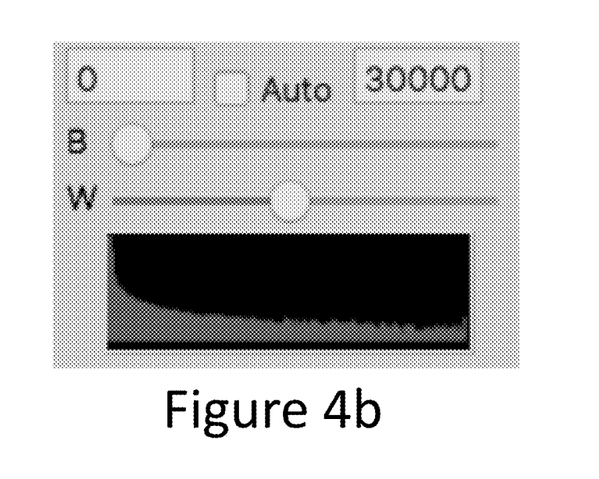
FIG. 4b shows a histogram of the image of M13 after intrinsic processing, according to the present invention.

The same set of Residual intensities previously obtained of the empty field of view was added to the defocused reference image of the M13 field of view and then these adjusted pixel intensities of the defocused image were subtracted from the focused image of M13. This resulted in an image of M13 that had a sky background greater than magnitude 23 per arc-sect, as shown in FIG. 4a.

Conclusion

Since it is unlikely that M13 (at a distance of 22,000 light years) absorbed any of the local solar illumination, the novel methodology of the present invention has in fact completely eliminated all the local solar, lunar and light pollution in the sky. The image of the target M13 was possible because the target in the field of view, the globular cluster of stars, provide their own illumination.

Example 2

Equipment

For this example, the same equipment as the one used in Example 1 was used.

Camera Calibration Data

The calibration of the camera was performed as in accordance with the calibration of Example 1 where dark field exposures were taken to eliminate any hot pixels in the field of view. An empty field of view was chosen such that no star had a magnitude less than 8 per arc-sect. The images were obtained in monochrome RAW format to ensure that there was no compression of the data.

Target Imaging Data

The telescope was then pointed and focused on the Moon as the target object. An exposure of 1/50 of a second at an ISO of 100 was used to image the target field of view. Then the telescope was quickly defocused and a second image of the target was obtained at the same exposure and ISO settings.

Intrinsic Processing

Figure 5A:
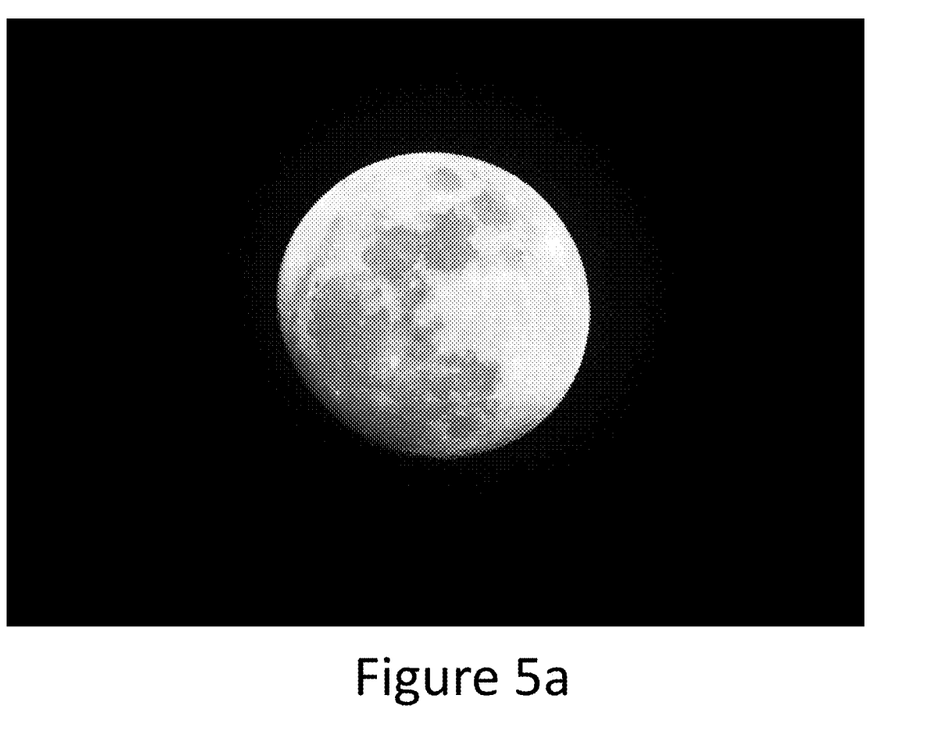
FIG. 5a shows an image of the moon taken using 1/50 of a second exposure at ISO 100.
Figure 5B:
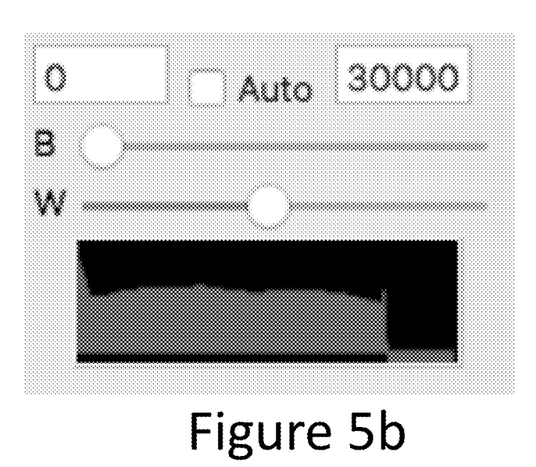
FIG. 5b shows a histogram of the image of the moon before intrinsic processing, according to the present invention.
Figure 6A:
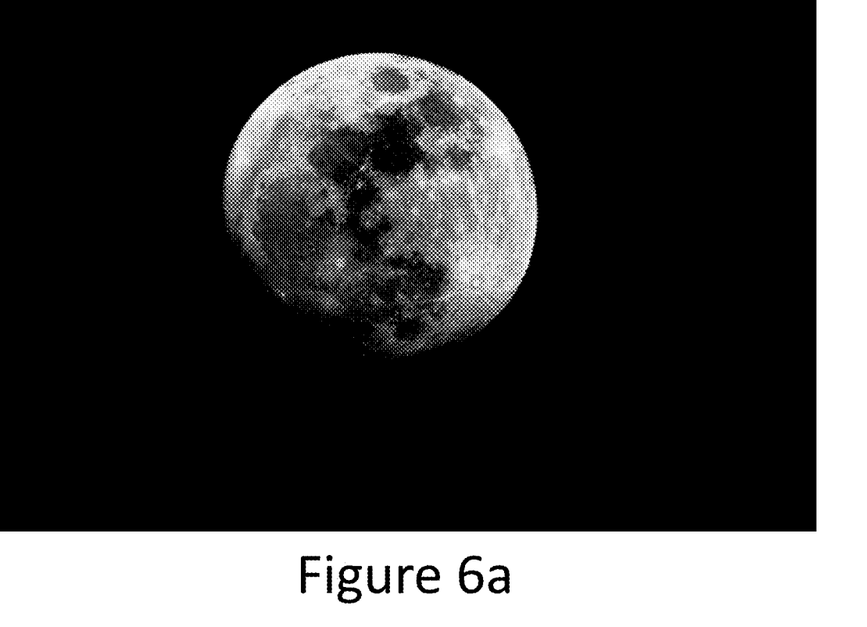
FIG. 6a shows an image of the moon in FIG. 5a after being processed according to the methodology of the present invention where intrinsic processing reduced the apparent over exposure by eliminating the non-absorbed irrelevant solar illumination and urban light pollution leaving only the reflected intrinsic spectral components from the moon.
Figure 6B:
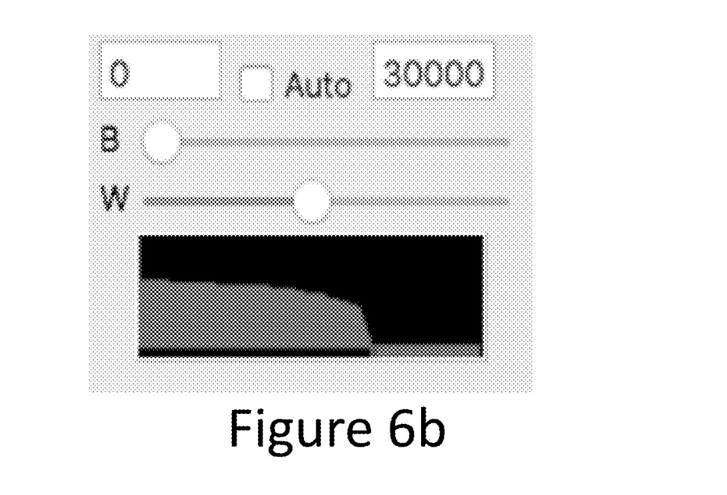
FIG. 6b shows a histogram of the image of the moon after intrinsic processing, according to the present invention.

The data and image processing was performed using the same methodology as in Example 1. The initial image of the Moon appeared to be over exposed, FIG. 5a. As can be appreciated, the intensity reduction of the moon surface between FIGS. 5a and 6a is due to reflection of only the intrinsic spectral components after performing the novel methodology rather than complete reflection of the solar illumination in FIG. 5a.

Example 3

Equipment

For this example, the same equipment as the one used in Example 1 was used.

Camera Calibration Data

The calibration of the camera was performed as in accordance with the calibration of Example 1 where dark field exposures were taken to eliminate any hot pixels in the field of view. An empty field of view was chosen such that no star had a magnitude less than 8 per arc-sect. The images were obtained in monochrome and color in a non-compressed JPEG format.

Target Imaging Data

The telescope was then pointed and focused on the emission nebula M8, the Lagoon Nebula as the target object. An in-focus exposure of 15 seconds at an ISO of 1600 was use to image the target field of view. Then the telescope was quickly defocused and a second image of the same target was obtained. According to an embodiment of the invention, this procedure was repeated four more times to obtain five focused/defocused data cubes.

Intrinsic Processing

Figure 7A:
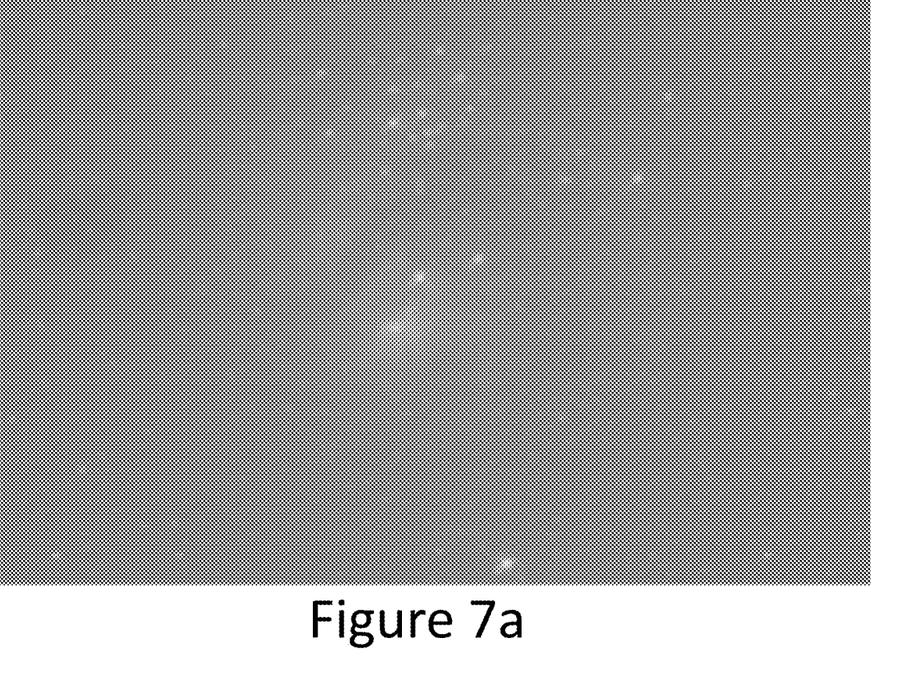
FIG. 7a shows an image of the Lagoon Nebula M8 taken in a sky containing moonlight and urbane light pollution.
Figure 7B:
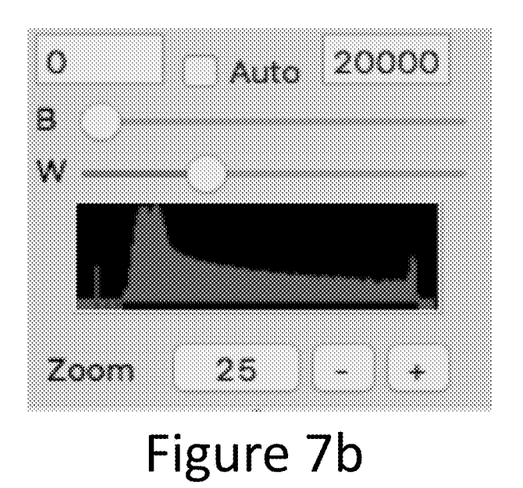
FIG. 7b show a histogram of the image of the Lagoon Nebula M8 before intrinsic processing.
Figure 8A:
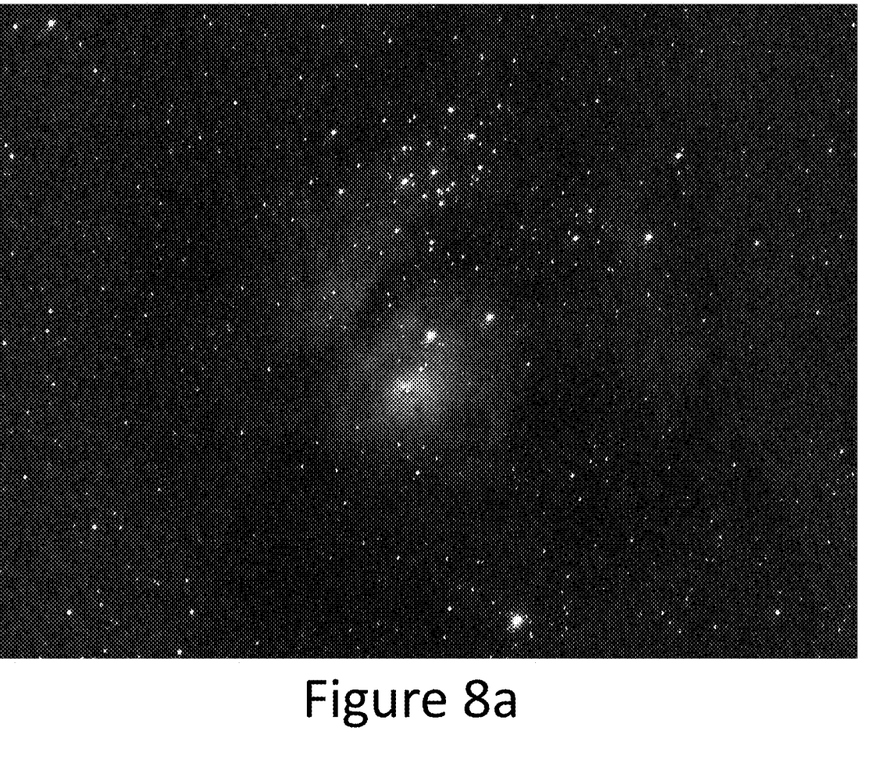
FIG. 8a shows an aligned stack of five images of the Lagoon Nebula M8 as taken in FIG. 7a after being processed according to the methodology of the present invention where intrinsic processing significantly darkened the sky while increasing the intensity and color of the M8 target.
Figure 8B:
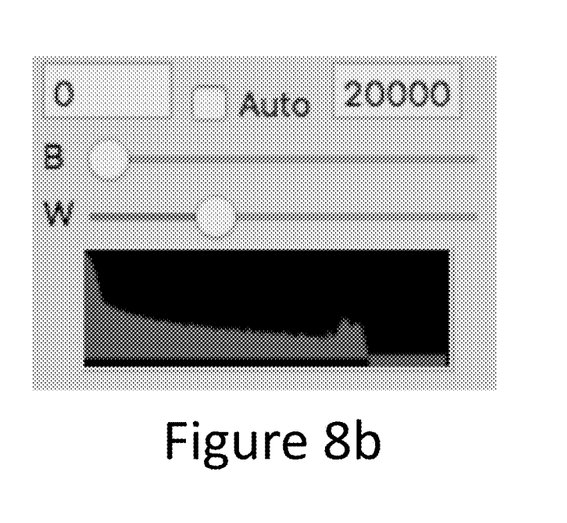
FIG. 8b shows a histogram of the aligned stack of five images of the Lagoon Nebula M8 after each image was intrinsic processed, according to the present invention.

The five sets of data were processed as explained in Example 1. The initial focused images of M8 appeared to have an over exposed background sky, FIG. 7a. However, when these data cubes were processed with the novel methodology described in this invention, the intensity of the background sky was significantly reduced as expected. The five intrinsic images were then aligned and additively stacked resulting in an increased intensity of the target M8, FIG. 8a.

Conclusion

It is unlikely the M8 nebula (at a distance of 4,100 light years) absorbed any of the local solar, lunar and light pollution illumination. However it is likely that M8 did absorb the illumination of nearby stars and generating emission components resulting in an intrinsic image of the M8. This was confirmed when the non-compressed JPEG color image showed the expected strong red emission features of the nebula.

Another area of application of this novel methodology is for intrinsic fluorescence spectral components in materials of interest. This is especially of importance in the field of medical research and imaging where fluorescent probes are the basis of investigation. Normally the instruments used in fluorescence imaging require the use of barrier filters and dichroic mirrors to separate the illumination wavelengths from the emission wavelengths. The following example demonstrates how intrinsic fluorescent components are revealed without the use of filters and mirrors.

Example 4

Equipment and Materials

A Canon T2i camera affixed with a 18-55 mm lens and mounted on a tripod was used to photograph a selection of minerals known for their fluorescent properties.

Methods

Figure 9:
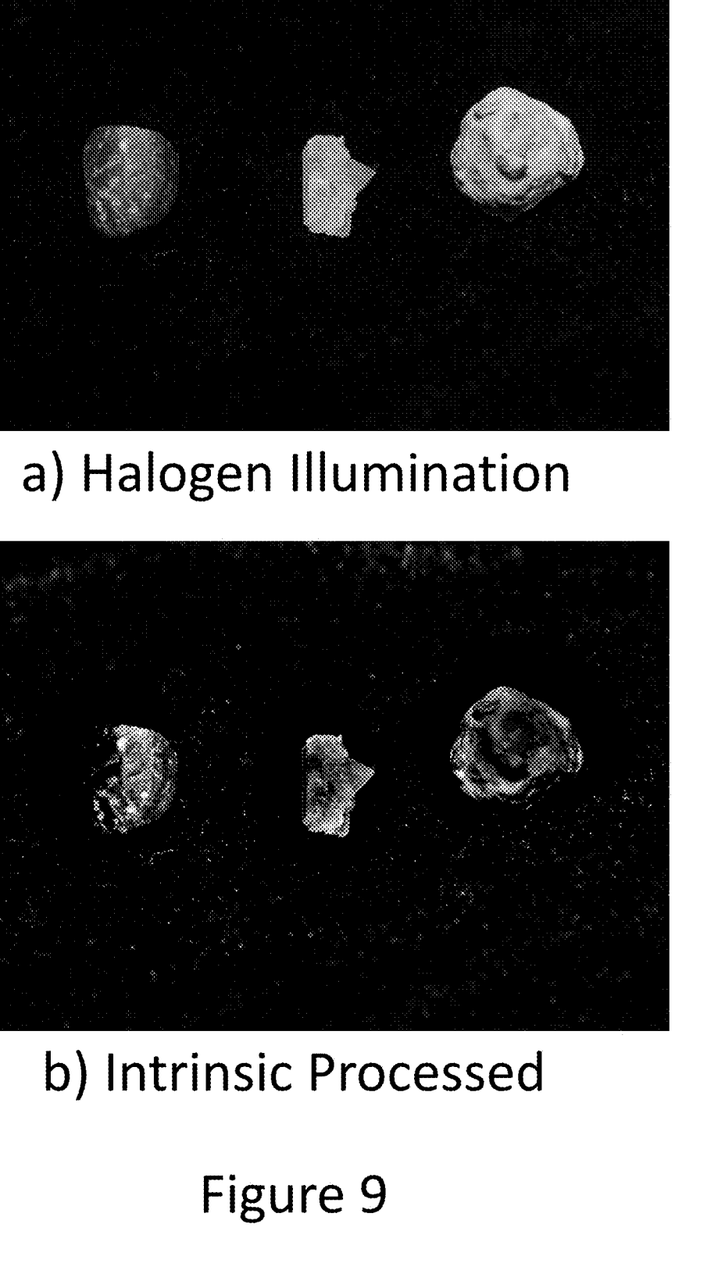
FIG. 9a shows an image of fluorescent minerals: ruby corundum, scolocite and tourquite, under white halogen illumination.
FIG. 9b shows an image of the same minerals of FIG. 9a after intrinsic processing according to the present invention revealing their multi-colored intrinsic fluorescent components.

The minerals, ruby corundum, scolocite and tourquite, were placed on a black velvet cloth and illuminated with a white halogen light source. Images were taken at ISO400 with an exposure of 1/50 second under focused and defocused settings. These photos were processed using the novel intrinsic procedure where the defocused image was subtracted from the focused image. This resulted in the focused image, FIG. 9a, appearing normal as seen under white light, whereas the image in FIG. 9b shows intrinsic colored emission components of each of the minerals.

Conclusion

By eliminating the irrelevant illumination components of the halogen light, the intrinsic emissions from the minerals were revealed. Note that no filters were used such that the absorption envelops of the materials were able to absorb wide wavelength ranges of the white illumination for efficient emission.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A method to obtain data cubes of low intensity intrinsic spectral images when imaging under high illumination conditions with an image capturing device without the use of filters, said method comprising:
   determining exposure, focus and defocus settings for an image capturing device, wherein said settings are determined in relation to a spatial field of view of a target of interest;
   obtaining from said image capturing device a focused data cube and a defocused data cube of an empty field of view having minimal spatial features of low intensity, wherein said focused and defocused data cubes are obtained with the determined exposure, focus and defocus settings of said image capturing device;

obtaining associated spectrum for each pixel in the spatial array of the focused data cube and the defocused data cube of said empty field of view, respectively, and subtracting across the wavelength range, the associated spectrum of the defocused data cube of said empty field of view from the associated spectrum of the focused data cube of said empty field of view in order to obtain a Residual spectra for each pixel in the spatial array; and adding, pixel by pixel, said Residual spectra to a defocused spectra in a defocused data cube of said target of interest to obtain an adjusted reference spectra and further subtracting, pixel by pixel, said adjusted reference spectra from a focused spectra in a focused data cube of said target of interest, effectively obtaining an intrinsic spectral image having a focused target data cube with each of its pixels associated with an intrinsic spectrum of said target of interest.

2. The method according to claim 1, further comprising visually showing said intrinsic spectral image.

3. The method according to claim 2, wherein said intrinsic spectral image is visually shown by at least one of: a printed medium and displayed on a monitor.

4. The method according to claim 1, wherein at least one of: said exposure, focus and defocus settings are determined manually by a user.

5. The method according to claim 1, wherein at least one of said exposure, focus and defocus settings are determined automatically based on spatial conditions of the target of interest and the specifications of said image capturing device.

6. The method according to claim 1, wherein a subsequent focused target data cube for the intrinsic spectral image is obtained by adding said Residual spectra to corresponding spectra of a subsequent defocused target data cube and then subtracting a new adjusted reference spectra from a spectra of the subsequent focused target data cube.

7. The method according to claim 1, wherein subsequent focused and defocused target data cubes of said target of interest are obtained using said determined exposure, focus and defocus settings.

8. The method according to claim 1, further comprising increasing a signal intensity of the intrinsic spectral components associated with the array of respective spatial pixels of the intrinsic spectral image of said target of interest by adding together a plurality of focused target data cubes of said target of interest.

9. The method according to claim 1, wherein each of said plurality of focused target data cubes is obtained by adding, pixel by pixel, said Residual spectra to a defocused spectra in a defocused data cube of said target of interest to obtain an adjusted reference spectra and further subtracting, pixel by pixel, said adjusted reference spectra from a focused spectra in a focused data cube of said target of interest.

10. The method according to claim 1, wherein images of said focused and defocused data cubes of said empty field of view and images of said focused and defocused data cubes of said target of interest are uncompressed.

11. The method according to claim 1, wherein no element of said empty field of view has a magnitude less than 8 per arc-sect.

12. The method according to claim 1, wherein the exposure setting is the longest exposure allowed by the image capturing device where the intensity of all the pixels of an image are within a linear intensity range without exceeding saturation.

13. The method according to claim 1, wherein said defocus setting is where there is no discernible detail within an image.

* * * * *